United States Patent [19]
Overland et al.

[11] Patent Number: 6,057,147
[45] Date of Patent: May 2, 2000

[54] APPARATUS AND METHOD FOR BIOREMEDIATION OF HYDROCARBON-CONTAMINATED OBJECTS

[76] Inventors: Bert A. Overland; Gary M. Mitchell, both of 3622 N. Garry Rd., Spokane, Wash. 99027

[21] Appl. No.: 08/786,484

[22] Filed: Jan. 21, 1997

[51] Int. Cl.[7] ............................... B09B 3/00; C12N 1/00; C02F 3/00
[52] U.S. Cl. ............... 435/262.5; 435/262; 435/821; 435/822; 435/824; 435/829; 435/832; 435/850; 435/872; 435/874; 435/289.1; 210/600; 210/601
[58] Field of Search ............... 435/262, 262.5, 435/822, 821, 824, 829, 832, 856, 872, 874, 289.1; 210/600, 601

[56] References Cited

U.S. PATENT DOCUMENTS

| | | | |
|---|---|---|---|
| 3,152,983 | 10/1964 | Davis et al. | 210/11 |
| 3,838,198 | 9/1974 | Bellamy et al. | 426/53 |
| 3,871,956 | 3/1975 | Azarowics | 195/2 |
| 3,899,376 | 8/1975 | Azarowics | 195/2 |
| 3,928,191 | 12/1975 | Belasco | 210/12 |
| 4,401,569 | 8/1983 | Jhaveri et al. | 210/610 |
| 5,298,082 | 3/1994 | Writz | 134/40 |
| 5,494,580 | 2/1996 | Baskys et al. | 210/611 |
| 5,561,059 | 10/1996 | Kaiser et al. | 435/101 |
| 5,753,122 | 5/1998 | Taylor et al. | 210/611 |

*Primary Examiner*—David M. Naff
*Assistant Examiner*—Deborah K. Wane

[57] ABSTRACT

The present invention is directed to an apparatus and method for enhanced bioremediation of hydrocarbons removed from a contaminated object comprising: (a) a basin for cleansing said hydrocarbon-contaminated object, said basin having a means for introducing a recycling bioremediating cleaning solution (NATURES WAY PC™) for washing said object, a means for draining said solution from said basin into a biochamber reservoir and a means for screening particles from said solution upon entry into said reservoir; and (b) said reservoir having a means for temperature control between 90° to 112° F., means for aerating said solution, means for agitating said solution, an outlet means to a plurality of filters for filtering said solution, an inlet means from said filters and means for removing filtered sediments. The device and method promote continuous microbial bioremediation of hydrocarbon contaminants in a self-propagating manner while cleaning the solution and filtering sediment without generating an environmentally dangerous waste trail. The cleaning solution comprises microorganisms of the genus Achromobacter, Actinobacter, Alcaligenes, Arthrobacter, Bacillus, Nocardia, Flavobacterium, Pseudomonas and mixtures thereof.

4 Claims, 11 Drawing Sheets

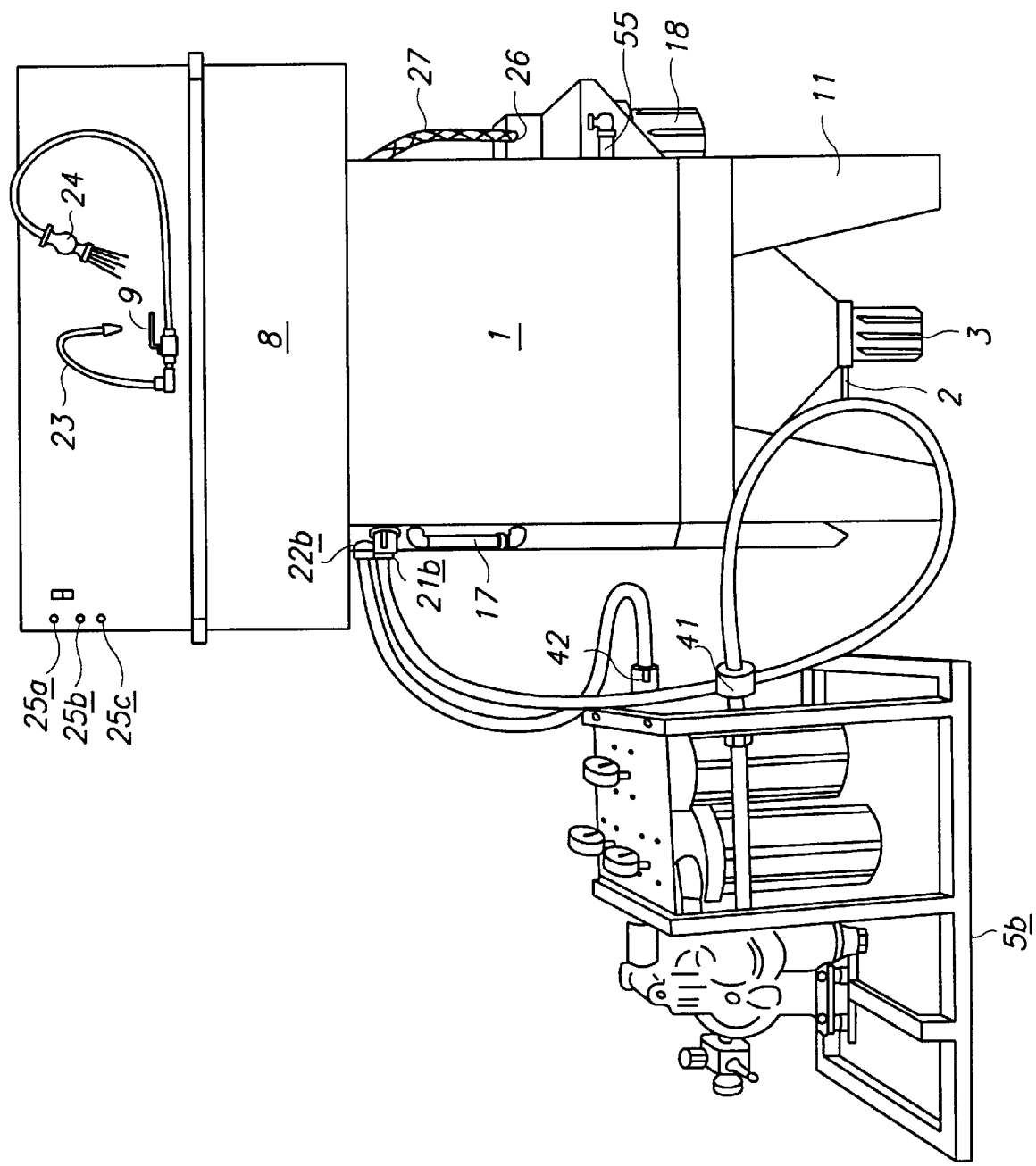

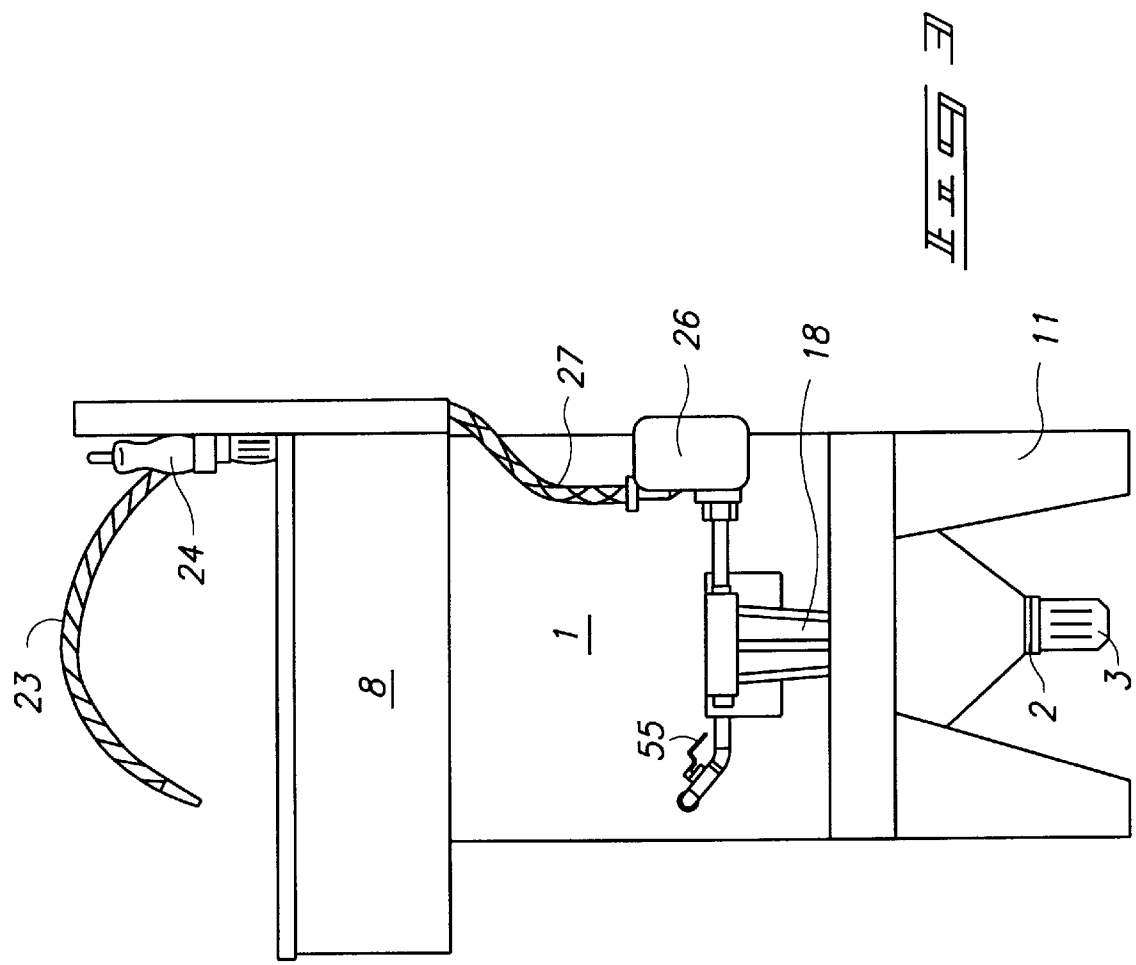

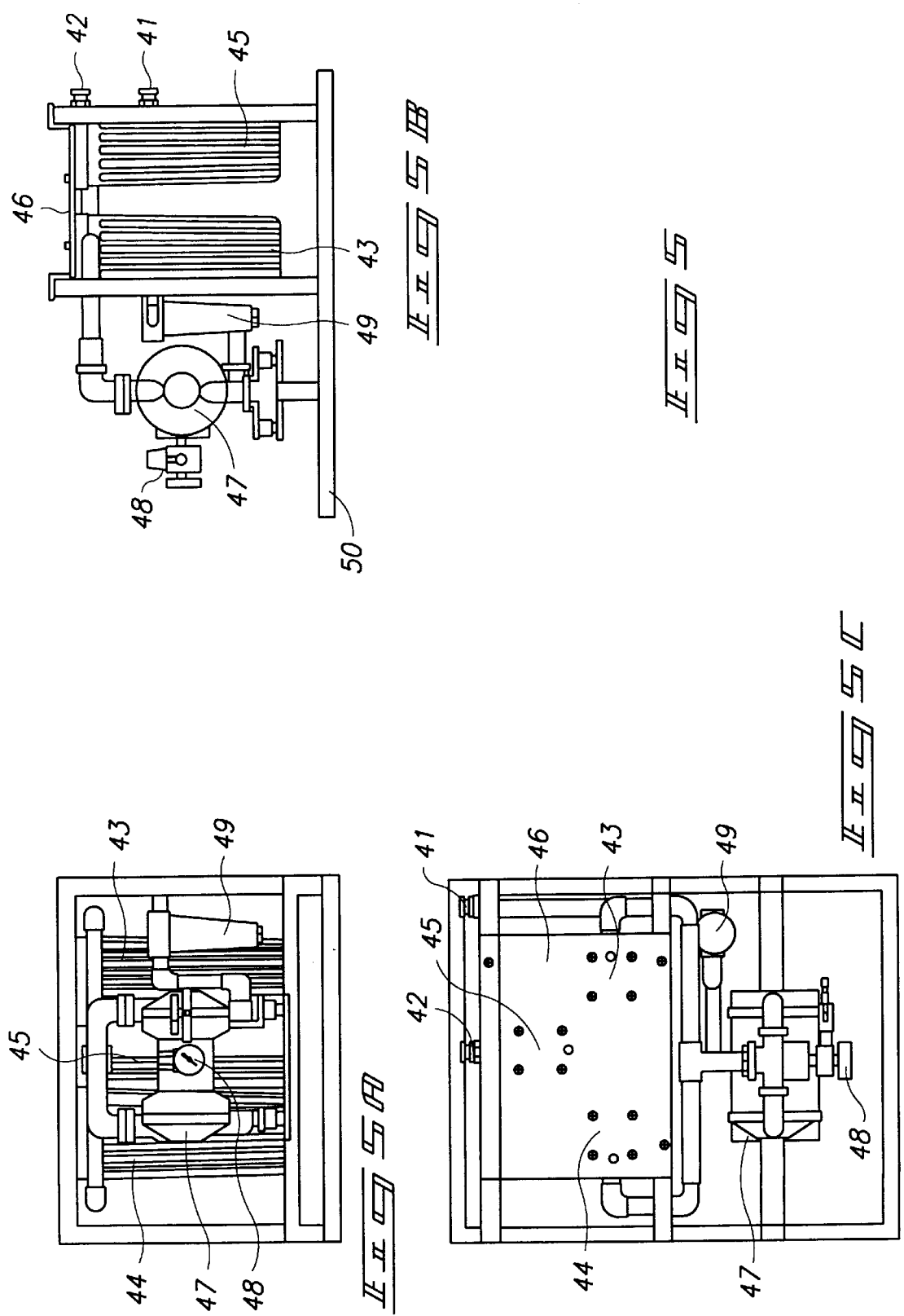

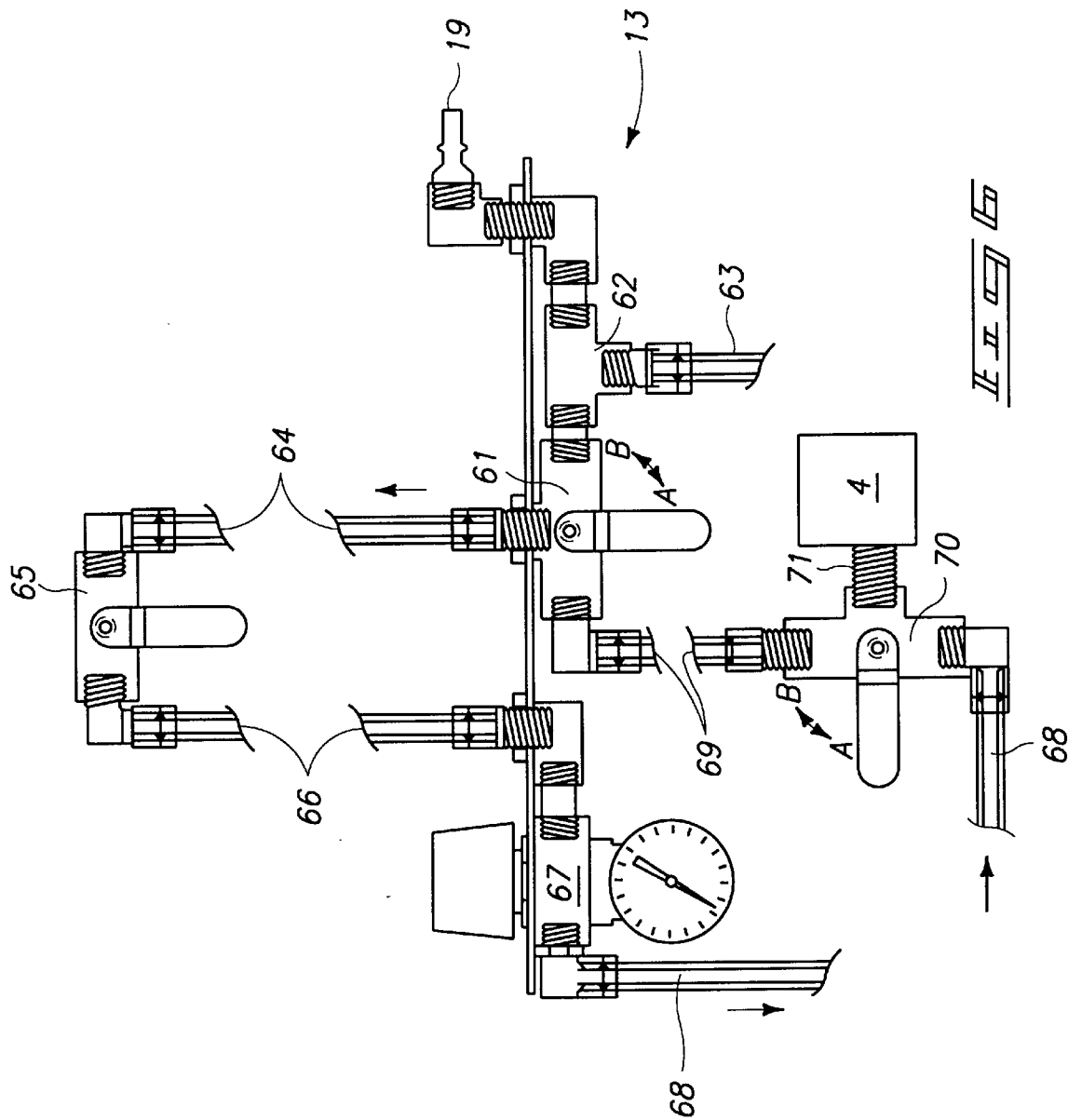

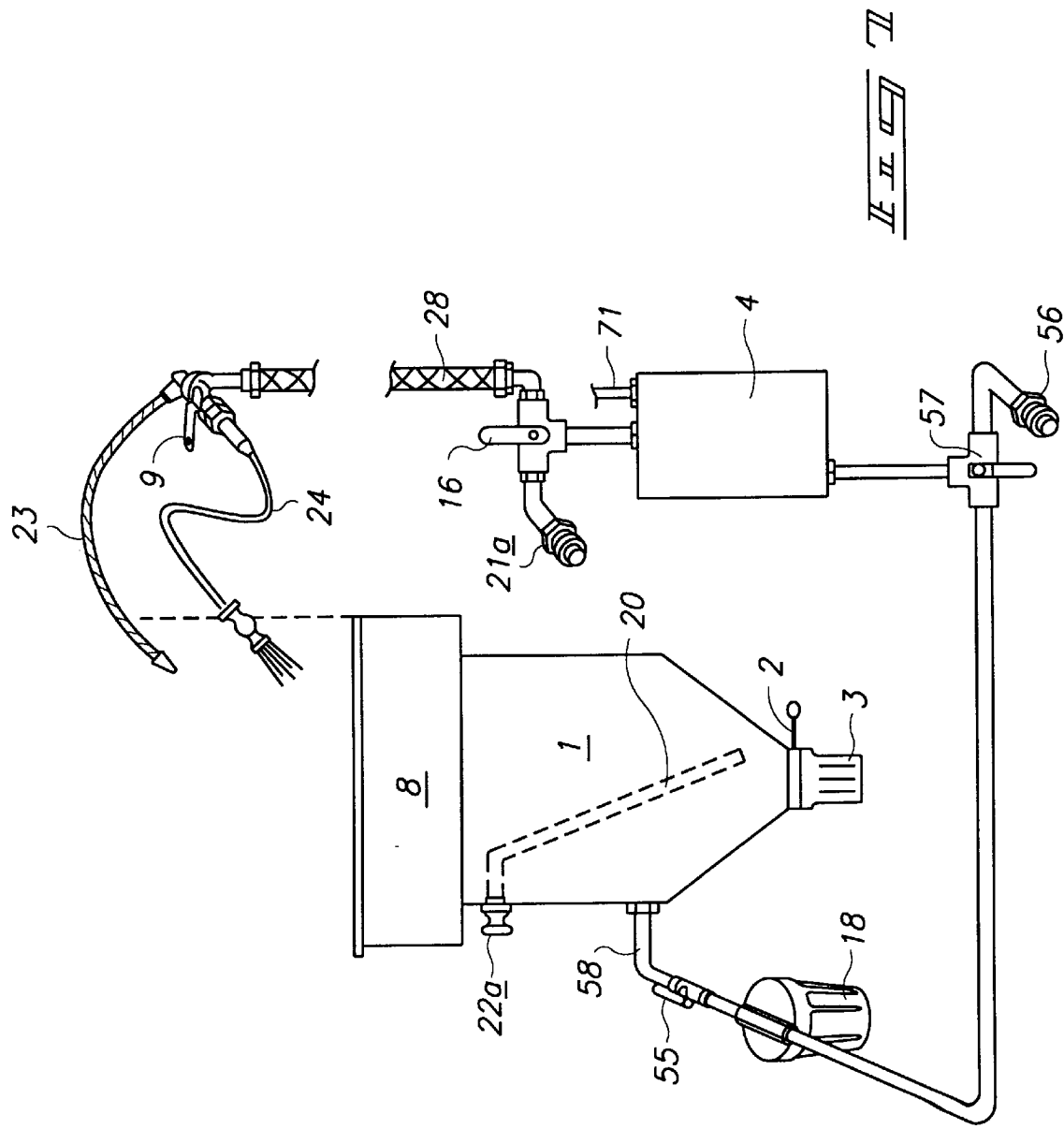

APPARATUS AND METHOD FOR BIOREMEDIATION OF HYDROCARBON-CONTAMINATED OBJECTS

BACKGROUND OF THE INVENTION

1. Field of the Invention

The present invention is concerned generally with an apparatus and method for bioremediation of hydrocarbon-contaminated objects, including biodegradation of petroleum products contaminating such objects. The present invention further relates to an apparatus for cleaning and the microbial bioremediation of hydrocarbon-contaminated objects, featuring a method for cleaning and the microbial bioremediation of hydrocarbon-contaminated objects, as well as the microbial bioremediation of the hydrocarbon-contaminate removed from the object. The method of the present invention uses microbial compositions which are environmentally friendly and which typically decompose hydrocarbons without polluting the environment.

More specifically, the present invention provides an efficient reservoir, acting as a biochamber, to accelerate the bioremediation of oil/grease contamination encountered in parts used, for example, in the automobile, aircraft and small engine industries where numerous objects are typically contaminated with oils and/or greases. The present invention also provides an environmentally friendly enhanced bioremediation method using oil and grease-degrading bacteria for cleaning objects which have been hydrocarbon contaminated.

The invention further relates to a method for cleaning hydrocarbon-contaminated objects by degrading the hydrocarbon constituents of petroleum products in any environment. The present invention advances state-of-the-art technology in the area of pollution control through the process of enhanced bioremediation.

2. Description of Related Prior Art and Information

This invention relates to an apparatus and method for enhancing bioremediation of hydrocarbon-contaminated objects such as car and airplane parts, and parts such as those encountered in industrial machinery, which from time to time need cleaning and/or repair. The method of the present invention takes advantage of certain microorganisms which are capable of degrading alkanes and other petroleum derived hydrocarbons, including greases as well as hydrocarbons, having unsaturation and multiple unsaturated sites, such as double and triple bonds e.g., aromatic hydrocarbons, alkenes, alkynes and cycloaliphatic compounds.

Hydrocarbons such as crude petroleum and petroleum-derived materials are typically characterized as a complex mixture of straight chain and branched alkanes or alkenes, saturated ring compounds and aromatic compounds. Crude petroleum products are also known to contain small amounts of sulfur, nitrogen, or oxygen covalently attached to the various hydrocarbon chains. Industrial products such as gasoline, kerosene, burner fuel oil, diesel oil, gas turbine oil, aviation fuels, lubricating oils and hydrocarbon greases are examples of petroleum-derived products. The widespread use of the above petroleum-derived products has a concomitantly associated environmental cost related to contamination of industrial parts, contamination of soils, or accidental spills or releases.

Cleanup operations of petroleum pollution are both physically and technically difficult and a number of potential solutions for bioremediation of petroleum pollution have been attempted or proposed. For example, current cleanup practices include: 1) physical removal of the polluting petroleum by use of absorption media; 2) dispersal using detergents; 3) burning; 4) microbial degradation under ideal conditions; 5) agglomeration of oil on water and sinking to the floor of the water body; and 6) use of organic chemicals, such as kerosene-based dispersants, to dissolve and disperse the oil. Each of the above measures has its own set of special environmental and technical considerations.

In years past, the generally accepted procedure for controlling environmental damage due to hydrocarbon contamination was to ship the undesirable contaminants to a secure landfill. However, given the decreasing availability of landfills willing to accept hazardous wastes, the high cost of detailed manifesting of the generated waste stream, the high cost of transport and removal of contaminants, and the potential exposure to liability associated with off-site transport and disposal, landfill disposal of objects contaminated with hydrocarbons is becoming an increasingly unacceptable and costly means for handling these materials.

An important procedure for reducing the amount of hydrocarbon contamination in the environment is known as bioremediation. The process of bioremediation relies on the hydrocarbon-degrading abilities of biologic materials such as bacteria, saprophytes, bacterial enzymes or saprophytic enzymes to degrade the hydrocarbon in the contaminated objects. The hydrocarbon degrading biologic materials are often naturally present in contaminated materials and, given sufficient time, can naturally degrade the hydrocarbon contaminants. However, this natural degradation process can often be promoted by directly adding biologic materials to the contaminated materials in an amount sufficient to degrade the hydrocarbons, or by encouraging the proliferation of hydrocarbon-degrading microorganisms, either naturally present, or present as a result of inoculation. Proliferation of hydrocarbon-degrading microorganisms can also be encouraged by the addition of nutrients, or by adjusting the conditions to favor growth of the desired microorganisms referred to as "enhanced bioremediation."

Bioremediation of hydrocarbon contamination is favored over removal or chemical treatment because of the lower cost, proven effectiveness, and the ability for on-site reduction of hydrocarbon contamination. However, these advantages can be outweighed by the substantial length of time necessary for bioremediation. Under optimum conditions, months or years may be required to reduce the levels of hydrocarbon contamination to a desired level. This disadvantage has greatly limited the potential use of bioremediation to reduce hydrocarbon contamination of materials.

The optimum combination of properties for a method, apparatus, and composition effective in the degradation of hydrocarbons, particularly one based in the utilization of microorganisms, is such that:

(1) the method, apparatus and composition must demonstrate acceptable efficacy in actual non-laboratory environments, yet be in such a form as to itself be non-toxic and non-deleterious, and in such a form so as not to generate deleterious products or chemicals harmful to, or befouling to the environment;

(2) the method and composition must be long-acting and rapid in the onset of its initial activity and require no further support or sustaining activities after initiation;

(3) the method and composition must be self-sustaining, so as to require no additional provision for nutrients or other supporting chemicals;

(4) the method and composition, together with the degraded, solubilized crude hydrocarbon product, must be self-dissipating after the substantial completion of the degradation of the hydrocarbon constituents, so as to require no retrieval from the environment and disposal; and (5) the method, apparatus and composition must be easy to effect and manufacture, while safe to personnel using the composition or carrying out the process, at all stages and times in its preparation and use.

U.S. Pat. No. 3,152,983 to Davis, et. al., discloses the microbial disposal of oily wastes. The method of Davis, et. al., is designed for large industrial waste separation and disposal, beginning with an oil water separator. The method suggests processing one batch at a time and is not a continuous, on-going method which preserves the microbes.

U.S. Pat. No. 3,838,198 to Bellamy, et. al., is directed at conditioning raw waste input for digestion by thermophylic aerobic microorganisms. The process is geared towards animal waste and is not a self-perpetuating process.

U.S. Pat. No. 3,871,956 to Azarowicz features a method for cleaning accidental oil spills on water or in soil. The method of the '956 patent does not utilize temperature or oxygen controls and is not a self-perpetuating process.

U.S. Pat. No. 3,899,376 to Azarowicz features microbial action for cleaning industrial effluent. This Azarowicz patent does one batch at a time, using a new microbial solution in each bath, however it is not a continuous accelerated method.

U.S. Pat. No. 4,401,569 to Jhaveri, et. al., describes a method and apparatus for treating hydrocarbons and halogenated hydrocarbon-contaminated ground and ground water.

U.S. Pat. No. 5,494,580 to Baskys, et. al., relates to a method for decontamination of a hydrocarbon-polluted environment by the use of certain bacterial compositions.

The above prior art is silent regarding the apparatus and bioremediation method of the present invention. Accordingly, there is a need for a process that will rapidly decontaminate hydrocarbon-contaminated objects in an efficient and environmentally acceptable manner. That need is now satisfied by the invention described below.

OBJECTS OF THE INVENTION

It is, therefore, the object of the present invention to provide the following:

a. an apparatus and method for bioremediation of hydrocarbon-contaminated objects, including enhanced biodegradation of petroleum products contaminating such objects.

b. an apparatus for cleaning and the microbial bioremediation of hydrocarbon-contaminated objects.

c. a method for cleaning and the microbial bioremediation of hydrocarbon-contaminated objects.

d. a method for cleaning and the enhanced microbial bioremediation of the hydrocarbon contaminate removed from the object.

e. in the method of the present invention, to use microbial compositions which are environmentally friendly and which typically decompose hydrocarbons without polluting the environment.

f. an efficient biochamber to accelerate the bioremediation of oil/grease contamination encountered in parts used, for example, in the automobile, aircraft and small engine industries where numerous objects are typically contaminated with oils and/or greases.

g. an environmentally friendly bioremediation method using oil and grease-degrading bacteria for cleaning objects which have been contaminated with hydrocarbons and/or greases.

h. a method for cleaning hydrocarbon-contaminated objects by degrading the hydrocarbon constituents of petroleum products in any environment.

SUMMARY OF THE INVENTION

The present invention is directed to an apparatus for the bioremediation of a hydrocarbon-contaminated object comprising:

a. a basin for cleansing said hydrocarbon-contaminated object, said basin having a means for introducing a recycling bioremediating cleaning solution for washing said object, a means for draining said solution from said basin into a biochamber and a means for screening said solution upon entry into said biochamber; and b. said biochamber having a means for temperature control, a means for aerating said solution, a means for agitating said solution, an outlet means to a plurality of filters for filtering said solution, an inlet means from said filters and a means for removing sediment.

The instant invention is further directed to a method for the bioremediation of a hydrocarbon-contaminated object comprising the steps of:

a. cleansing said object in a basin with a bioremediating solution;

b. drying said object sufficiently to permit continued bioremediation of remaining oily film on the surface of said object;

c. screening said solution to remove large grit particles and sediment from entering into a heated biochamber reservoir;

d. mixing and agitating said solution with said hydrocarbon particles in said reservoir;

e. aerating said solution in said reservoir to provide oxygen to a microbe colony in said solution;

f. heating said solution in said reservoir to a temperature range of between about 90° to 112° F.;

g. filtering said solution of micron sized particles and debris; and h. recycling said solution from step (g) to said reservoir.

Other objects and advantages of this invention will become apparent upon reading the following detailed description and appended claims.

BRIEF DESCRIPTION OF THE FIGURES

FIG. 2 is a front schematic view of the bioremediation system wherein the washer is powered by an electric pump.

FIG. 3 is a side schematic view of the bioremediation system wherein the washer is powered by an electric pump.

FIG. 5a–c is a schematic view of the bioremediation filtration system used in the electric-powered model of FIG. 2 and FIG. 3 wherein high pressure air is provided from an outside source to an air pump to drive the solution through the filtration unit.

FIG. 6 is a detailed schematic view of the air distribution panel with air lines and controlling valves of the air-driven model in FIG. 1.

FIG. 7 is a detailed schematic view of the fluid circulating system of the air-driven model in FIG. 1.

DESCRIPTION OF THE PREFERRED EMBODIMENTS

Figure 1:
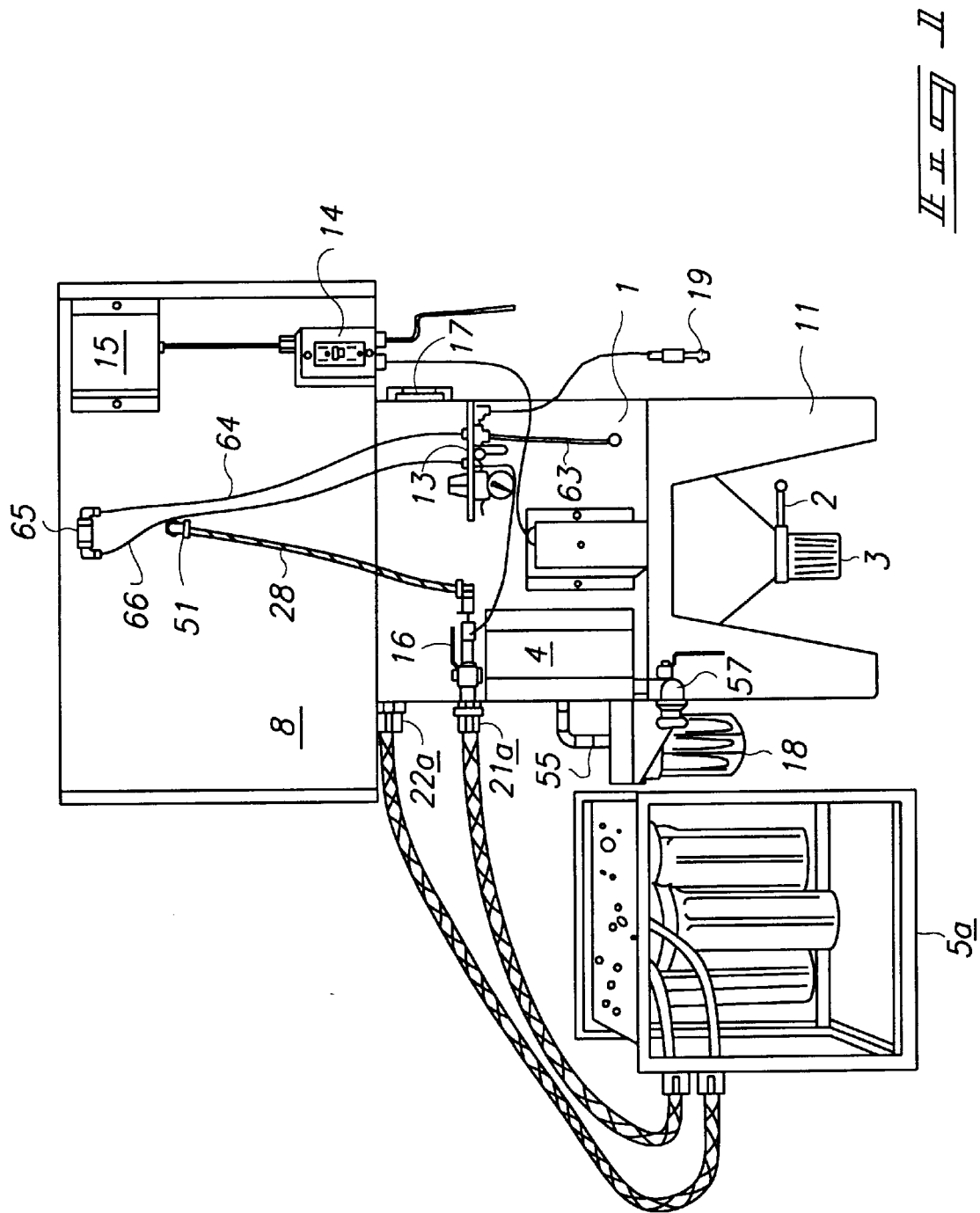
FIG. 1 is a rear schematic view of the bioremediation system wherein the washer is powered by an air-driven pump.

The method of the present invention for use in cleaning hydrocarbon-contaminated objects, is a purely biological process in which selected microorganisms break down the hydrocarbon and convert it to non-toxic products.

The apparatus, method and important components, such as the washer/filtration system of the present invention, arose from efforts to eliminate unhealthy environment-polluting petroleum-based cleaning solvents from the work place and replace them with an environmentally friendly, non-hazardous alternative. In the past, many attempts have been made to accomplish this, but none have been successful or economical. Prior art devices have only resulted in a reservoir filled with contaminated cleaning solution requiring other specialized and controlled disposal methods. Others who have attempted to use microbial bioremediation could not keep the solution permanently perpetuating, resulting in high cost manifesting and waste disposal problems. Additionally, none of the non-petroleum based products cleaning performance were satisfactory when compared to petroleum based solvents. Furthermore, none of the alternatives have proven to be cost effective until Applicants' new and proven developments.

Initially, a parts washer and filtration system that encompassed all of the necessary qualities to sustain and propagate enhanced hydrocarbon-degrading microbes in an aqueous base solution had to be developed. Applicants have successfully used a solution with the necessary and required qualities to degrade and transform hydrocarbons to $H_2O$ and $CO_2$, but with the mechanism to keep the microbe colonies alive, healthy and reproducing in a sludge-free solution.

To accomplish the method of the present invention, a washing and cleansing basin (washer basin) is used to clean hydrocarbon-contaminated parts. The washer basin typically has the following elements:

1. a microbial cleaning solution to clean and de-grease parts and objects in the basin;

2. a drain from the washer basin to a heated and aerated biochamber reservoir below; and 3. a pump to circulate the cleaning solution from the reservoir to the washer basin spigot and flow-through brush for washing the part.

The microbial cleaning solution used in the present invention is a product of NATURES WAY, INC. sold under the trademark of PC™ and protected under U.S. Pat. No. 5,561,059 to Kaiser, et. al., "Substrate Bioavailability Enhancing Chemical Mixture for Use in Bioremediation". The NATURES WAY PC™ cleaning solution contains the following natural hydrocarbon-degrading aerobic microorganisms: Achromobacter, Actinotobacter, Alcaligenes, Arthrobacter, Bacillus, Nocardia, Flavobacterium and Pseudomonas spp. The PC™ parts aqueous cleaning solution is an innovative, cost-effective solution that had been under development and extensive field testing under industrial standards for several years. The solution does not contain any harmful ingredients and is user-friendly to humans and the environment.

The naturally occurring microbes comprising the solution feed on hydrocarbons transforming oil and grease to harmless carbon dioxide and water. The microbes are not genetically developed but gathered from oil spills that were being cleaned by a natural process. The aerobic microbes of PC™ thrive on hydrocarbons. If their food source or oxygen supply is depleted they will die and become part of the biomass. The PC™ cleaning solution bioremediates oil, grease, varnished parts and other petroleum products with ease. Petroleum-based solvent processes are harsh to both workers and the environment.

The cleaning of objects and subsequent bioremediation ability of the present invention is superior to any other apparatus or method presently used for that purpose. Because chemical solvents are avoided, there are no harsh or sensitizing chemicals that can irritate human skin. The PC™ cleaning solution, when optimally heated and aerated, washes hard varnish with ease without the presence of strong odors commonly associated with solvents. When using the PC™ solution, harmful volatile chemicals are immediately neutralized.

The PC™ cleaning solution, as used in the present invention, is a heavy duty water-based bioremediating cleaner that degreases contaminated objects and hydrocarbon-contaminated fluids. Said solution was developed to eliminate concerns associated with health, safety, disposal and transportation of liquid hydrocarbon wastes (liquid and sludge) found in petroleum-based cleaning solvents in use today throughout the world.

Since bioremediation of all contaminates is dependent on the presence of specific natural microbes capable of degrading the pollutant, applied bioremediation (bio-augmentation using selected microbes) assures the presence of effective microbe colonies. Microbial transformation of organic contaminates occurs because the organisms use the contaminates for their own energy needs, growth and reproduction. With the addition of environment-friendly enhancing agents that support the microbes and increase the bio-availability of the hydrocarbon contaminates, bioremediation cleanup (transformation to water and carbon dioxide) proceeds at an accelerated rate.

The limiting factors of microbe population growth, and therefore accelerated degradation of contaminates, are crowding, toxicity, accumulated wastes that form oxygen-starving sludge and nutrient exhaustion (food and/or oxygen). Since efficient, nontoxic emulsifiers are put to use in conjunction with the naturally customized enzymes produced by microbes, the contaminates (oil and grease) are so sufficiently dispersed, that crowding does not occur. The long chain hydrocarbons are immediately broken down to micron size colloids for the microbes. Enhanced applied bioremediation will occur and continue indefinitely with no hazardous waste trail as long as the solution is used in a device comprising all of the necessary support qualities.

Health and safety for personnel in repair facilities has been a top priority concern for several years. Numerous advancements have been accomplished to make the work place a better environment, but there is still great need for improvement. Due to technical problems and cost, parts cleaning in maintenance facilities is frequently neglected. Petroleum based products are a source of serious health concerns and have expensive disposal problems. The cost of controlling environmental problems continues to rise, while health risks to technicians on the job remain unattended.

For years the scientific community has attempted to develop alternative cleaners to eliminate health risks and disposal problems, but have done so with limited success. Cleaners were advertised as fully bio-degradable while still in their container. However, the same cleaners are considered hazardous waste when contaminated with the oil and grease they remove. These cleaners did help alleviate the health risks, but had disposal regulation problems which added to their expense, and they did not clean nearly as well as petroleum based solvents.

To accommodate a parts aqueous cleaning and bioremediation solution that has the ability to transform hydrocarbon waste to harmless by-products at the source, instead of transporting them for costly disposal, an upgraded parts washer has been developed with a bioremediation filtration system that can filter out sediments to less than ten microns.

Hydrocarbon-devouring microbes flourish best at temperatures between 90° F. and 112° F. They belong to an aerobic microbe family that requires oxygen; thus both a heat source and a method for delivering oxygen is included in the washer component of the present invention. The microbes of the cleaning solution transform hydrocarbons, but the issue involving sediment still had to be dealt with. If enough sediment builds up in any solution it will reach the point of maximum carrying capacity, develop a sludge, and the entire solution must then be discarded. However, when servicing the aqueous cleaning solution with a bioremediation filtration system, filtrate and sediment are filtered out without disturbing microbes, enzymes, surfactants or the bioremediation action. Because hydrocarbons are reduced to microscopic size colloids by the microbes, enzymes and heat, the filters trap and retain only sediments and filtrates. The small size of the microbes, enzymes, emulsifiers, and non-remediated hydrocarbons allow them to pass through the filters.

The combination of microbes transforming hydrocarbons, and filters removing and trapping the cleansed sediment makes for a complete ecological system with no waste trail. Even if the washer is accidentally overloaded, the aqueous microbial cleaning solution, retaining its properties, can be salvaged. The serviceable filtration unit utilizing an optional external storage tank can retain the cleaning solution, if required. Any excess oil is allowed to accumulate on top of the washer reservoir. The solution is then drawn out and filtered down to the excess oil, the oil is re-routed to a shop waste-oil container, the cleaning solution is returned to the parts washer, and the expense of a refill and costly disposal of contaminated solution is eliminated.

The present invention provides an efficient heated biochamber reservoir to accelerate the bioremediation of oil/grease contamination and perpetuate microbial growth by utilizing the following inventive stages:

a. Screening sediment traps for removing gasket and/or sealer particles and large grit, thereby preventing them from entering the biochamber;

b. washing the object/part using recycled microbial solution coming from a spigot hose and flow-through brush;

c. drying the object/part wherein bioremediation continues to thoroughly rid the part of all hydrocarbon contamination from cracks, crevices, joints, etc., during the drying period;

d. mixing and circulating the microbial cleaning solution to blend and dilute the hydrocarbon contamination evenly in order to prevent microbial crowding, clumping, etc., and to gain maximum microbial working efficiency for the bioremediating solution by breaking the hydrocarbon contaminate into microscopic colloids after introduction to the reservoir;

e. aerating at a rate sufficient to promote the blending process and furnish necessary oxygen to the microbial solution;

f. heating to an optimal temperature range to enhance the reproduction and incubation of new microbes;

g. trapping heavier sediment and particles through a sediment trap attached to a tapered reservoir base;

h. controlling of the entire biochamber to maintain optimum circulation, mixing/blending, aeration, heating and sediment trapping in order to propagate microbial reproduction and growth to perpetuate indefinite bioremediation of hydrocarbon contaminates;

i. filtering the cleaning solution to remove lighter, suspended and bioremediated-cleansed sediment particles to prevent an oxygen-starved sludge from forming which would terminate the action of the microbes; and j. continuous recycling of the solution in the biochamber reservoir to eliminate the transporting and disposal problems associated with hydrocarbon waste generation and disposal.

The apparatus of the present invention has four major sections: 1) a washer; 2) a biochamber reservoir; 3) a base stand; and 4) an independent and air-driven divorced cleaning solution filtration system. The air-driven washer model is designed to be powered with regulated air from an air-driven dual diaphragm circulating pump 4 as shown in FIG. 1. When the air-driven model is switched from washer cycle to filtration cycle, it uses unregulated, high pressure air required by the filtration system shown in FIG. 4a–c, in order to effectively drive the polluted cleaning solution through the filtration unit. In the electric powered model in the washer cycle, the washer fluid is driven by an electric motor powered pump 26 as shown in FIG. 2 and FIG. 3. The electric model is filtered using a completely divorced filter system powered by its own air diaphragm pump to drive the polluted solution through the filtration system as shown in FIG. 5a–c. The air-driven washer shown in FIG. 1 has air-driven pump 4 used for the normal wash cycle and when switched to the filtration cycle, it drives the washing solution through a series of divorced filters 5a as detailed in FIG. 4a–c.

FIG. 6 is a detailed drawing of the air distribution panel 13 of the air-driven dual diaphragm pump system. Shop line air enters the air control system at inlet 19. With distribution three-way valve 61 in position A, and pump three-way valve 70 in position A, air pressure is directed through brass "T" connector 62 into reservoir air line 63 to provide aeration to the cleaning solution in the heated reservoir 1. Also with valve 61 in position A, air pressure is directed through valve 61 into air line 64 to shut-off valve 65, on through air line 66, through air pressure regulator 67 continuing to air line 68, into pump three-way valve 70, through air inlet 71 of air-driven pump 4 to provide regulated air for the wash cycle.

When distribution valve 61 is at position B, and pump three-way valve 70 is at position B, shop line air entering at inlet 19 is directed through connector 62, into valve 61, (by-passing air line 64), into non-regulated air line 69 through pump three-way valve 70 through air inlet 71 of air-driven pump 4 to provide non-regulated air for the filtration cycle.

The electric-powered washer shown in FIG. 2 and FIG. 3 is equipped with electric circulating pump 26 used only for the wash cycle. There are two traps incorporated into both the air-driven system, FIG. 1, and the electric powered system, FIG. 2 and FIG. 3, as a first sediment trap 3 and a second sediment trap 18.

With reference to the air-driven model in FIG. 1, and the electric-driven model in FIG. 2 and FIG. 3, the apparatus has heated reservoir 1 functioning as a biochamber designed to provide rapid and complete bioremediation of hydrocarbon contamination suspended in a liquid cleaning solution comprised of PC™ blended in water. The biochamber reservoir is thermostatically controlled to maintain a temperature range of between about 90° F. and 112° F., with the upper range being the ideal temperature required for colony growth. An adjustable percolating air bleed 63 from air distribution panel 13 continuously furnishes oxygen to aerobic microbes thriving in the cleaning solution in reservoir 1.

The evaporation rate of the cleaning solution is minimal due to the tightly closed reservoir. The circulating solution returns from washer basin 8 to reservoir 1 after use, through drainage slots in a sump screen housing located at the bottom or floor of washer basin 8. The drain can be sealed by a steel stopper/screen with a neoprene sealing ring when washer basin 8 is not in use for long periods of time, such as overnight and weekends. Evaporation from the cleaning solution will condense on the underside of washer basin 8 and drip back into reservoir 1 containing the solution.

The lower section of reservoir 1 angles 45 degrees down from all four sides, through a supporting base stand 11, and connects to a sliding gate valve 2 with an operating handle to reservoir 1. Attached to sliding gate valve 2 is first removable sediment trap 3. Sliding gate valve 2 allows removal of any trapped sediment during scheduled routine service without having to remove the cleaning solution. A sight tube 17 is provided on the top side of reservoir 1. Second removable sediment trap 18 with a sediment trap shut-off valve 55 is connected to reservoir 1. Reservoir 1 has quick-disconnect outlet 21a for unfiltered solution flowing to bio-process filtration unit 5a. After filtration, the cleansed solution is returned to reservoir 1 through quick-disconnect inlet 22a.

In the electric powered model there is a similar quick-disconnect outlet 21b for unfiltered solution flowing to bio-process filtration unit 5b. Following filtration, the cleansed solution is returned to reservoir 1 through quick-disconnect inlet 22b. The filtration unit of 5b is air-driven with unregulated, high pressure air, identical to unit 5a, with air derived from an outside source. In FIG. 1 the cleaning solution is driven by an air powered dual diaphragm pump 4, through a three-way outlet valve 16. Valve 16 can either direct the solution through the wash cycle by passing through fluid line 28, inlet 51 and through either a spigot 23 or a flow-through brush 24 as directed by a selective three-way valve 9; or the solution can be sent to the filtration unit 5a through outlet 21a. If the solution is directed to wash basin 8, it then gravity-returns through a sump drain screen to reservoir 1 where bioremediation continues.

Figure 4A:
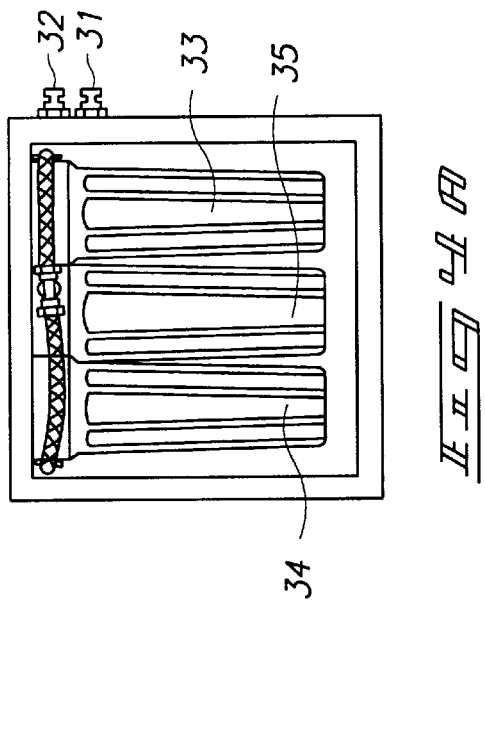
FIG. 4a–c is a schematic view of the bioremediation filtration system used in the air-driven model of FIG. 1 wherein the air-driven washer pump provides unregulated air pressure to drive the solution through the filtration unit.
Figure 4B:
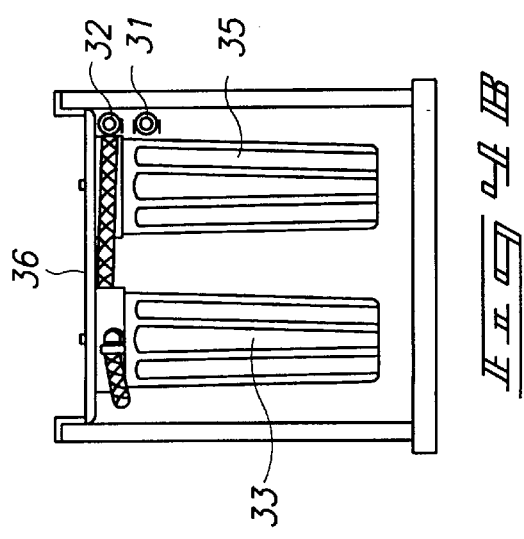
Figure 4C:
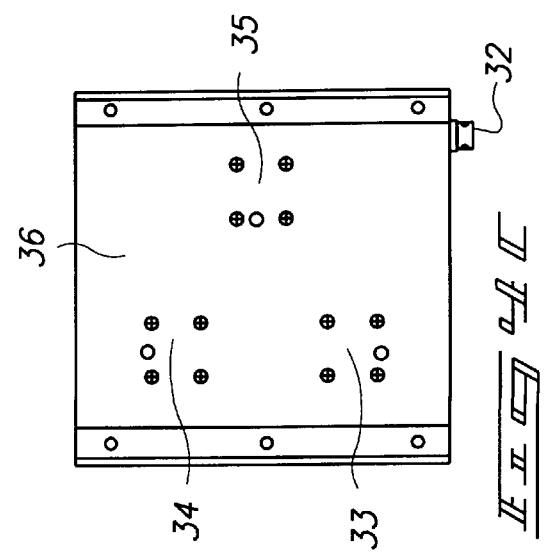

If the solution is directed to the filtration unit, it passes through outlet 21a through filtration unit 5a detailed in FIGS. 4a–c, and returns the cleansed solution to reservoir 1 through inlet 22a. The pulsating air-driven action of the solution through the series of filters, in either unit 5a (air-driven washer) or unit 5b (electric powered washer), removes sediment of less than 10 microns, preventing a microbe-suffocating sludge from forming in reservoir 1. If the minute suspended sediment particles were allowed to accumulate, they will reach a point of saturation and sludge will form. Sludge can starve microbes of oxygen, killing aerobic microbes and terminating the microbial bioremediation processes, thereby allowing the cleansing solution to become septic. Strict temperature control of the cleaning solution and oxygen supply, along with sludge prevention, combine to maintain life support for the ravenous aerobic microbe colonies.

In FIG. 2 and FIG. 3, the system in the wash cycle is powered by an electric circulating pump 26 that propels the solution through fluid line 27 to wash basin 8 wherein the solution can either flow through spigot 23 or brush 24. To remove sludge-forming sediment in the electric powered system, divorced filtering system 5b is used (basically the same as divorced filtering system 5a in the air-driven model). When filtering the electric model, a dual diaphragm air-driven pump 47 is connected by a fluid line to outlet 21b to draw contaminated, unfiltered solution from reservoir 1 through pickup tube 20. The solution is then powered through filtering system 5b with return of the clean and filtered solution through inlet 22b to reservoir 1. Air-driven pump 47 is operated until pressure on the filter gauges peaks and remains constant for two minutes.

Reservoir 1 and washer basin 8 can accommodate both the air-driven and the electric-powered models and is produced with the same mounting studs for the electric or air-driven pumps, fluid line connectors and electrical elements required for either the air driven or the electric powered pumps. Spigot 23, flow-through parts brush 24 and three-way valve 9 are located on the back-splash of wash basin 8. The back-splash is also the mounting surface for a power-on indicator light 25a, a heater-on indicator light 25b, a low-fluid level indicator flashing light 25c, and either an air pump on/off valve 65, in FIG. 1, or an electric on/off switch for the electric model. A low-level fluid control box 15 is located on the of back of the back-splash of wash basin 8.

Washer basin 8 has threaded studs that secure it to reservoir 1. A lower support stand 11 cradles reservoir 1 on all four sides at the upper portion of the 45 degree tapered area. Reservoir 1 is secured to lower support stand 11 with wing nuts on two mounting studs. Access to the control handle of sliding gate valve 2 is provided for at the rear of lower support stand 11, allowing a servicing agent to empty first sediment trap 3 during service without draining reservoir 1.

The entire electrical system is protected by a U.L. listed ground fault circuit interrupter ("GFCI") installed in a water tight die cast electric box. Both the air and electric models use a 120 volt, 1250 watt heater element with thermostat control 12, which connects to a ground fault circuit interrupter 14. The ground fault circuit interrupter also supplies power to the low level fluid indicator. The circuit operates at 12 volts at 0.005 amperes of direct current (DC) for safety purposes. The heater element and thermostat 12 are monitored with panel lights to verify that power is on in the machine and indicate when the heater is cycling.

A low-level fluid alert warning float/switch is mounted on the rear inside wall of reservoir 1 and is connected to flashing indicator light 25c located on the back-splash of washer basin 8. The air-driven model in FIG. 1 needs only these electrical elements because the fluid pump is air-driven. The electric powered model in FIG. 2 and FIG. 3 requires an additional electric on/off switch and circuitry for the electric powered fluid pump.

FIG. 3, a side view of the electric powered model, shows first sediment trap 3 with sliding gate valve 2. Electric powered pump 26 and second sediment trap 18 are mounted on the side of reservoir 1. Sediment trap shut-off valve 55 allows removal of sediment trap 18 without draining reservoir 1. Electric circulating pump 26 has a connecting fluid line 27 to valve 9 to direct solution to spigot 23 or flow-through brush 24.

FIGS. 4a–c diagrams the filtration system for the air-driven model. A filter inlet quick-disconnect 31 and fluid line receives dirty and unfiltered solution from reservoir 1 through the fluid line from reservoir outlet 21a. The solution is directed simultaneously through parallel first filter 33 and a second filter 34. Gross amounts of large, as well as microscopic debris are filtered from the solution and retained by parallel filters 33 and 34. Following initial filtration, the solution passes through a third filter 35 connected in series before continuing on through a quick-disconnect 32 and a fluid line through inlet 22a returning to reservoir 1. The two parallel filters 33 and 34, and third filter 35 are mounted to a filter mounting platform 36.

FIGS. 5a–c show the filtration system for the electric powered model. A filter inlet quick-disconnect coupling 41 and fluid line receives contaminated, unfiltered solution through 21b from reservoir 1. Unlike the air-driven model, the filtration system for the electric powered model contains an air-driven dual diaphragm pump 47 to power the filtration system. Pre-strainer 49 removes heavy particles, thus protecting the pump. After passing through the pump, the solution is directed simultaneously through parallel filter 43 and a second filter 44. As in the air driven model, gross amounts of large as well as microscopic debris are filtered out from the solution, clinging to parallel filters 43 and 44. Following the initial filtration, the solution then passes through a third filter 45 connected in series before continuing on through a quick-disconnect coupling 42 and a fluid line returning to reservoir 1. Parallel filters 43 and 44, and filter 45 are secured to a filter mounting platform, 46. The air-driven dual diaphragm pump 47 is mounted to a base platform 50 which supports the entire system, and is powered by an independent air supply.

FIG. 7 is a detailed schematic view of the fluid circulating system of the air-driven model in FIG. 1. The cleaning solution enters fluid line 58 from reservoir 1 passing through shut-off valve 55 and through second sediment trap 18. The solution then flows through a three-way valve 57 to pump 4. Three-way valve 16 can divert solution through outlet 21a to a solution storage tank. Quick-disconnect inlet 56 is used to draw stored solution to the system. The solution is diverted to a storage tank when the washer needs servicing requiring fluid removal. Drainage of the washer may also be required for storage, relocation, or when it is not in operation.

When the solution flows to pump 4, it is pumped to valve 16 where it can either continue within the wash cycle through fluid line 28 to wash basin 8 through spigot 23 or brush 24, or in the alternative, it can be pumped through outlet 21a to filtration unit 5a or a storage tank.

The electrical power circuitry provides the necessary power and controls to maintain the parts washer at optimum operating conditions. The difference in circuitry between the electric powered model and the air-driven model is that the electric model includes an electric pump and a lighted on/off switch.

Figure 8:
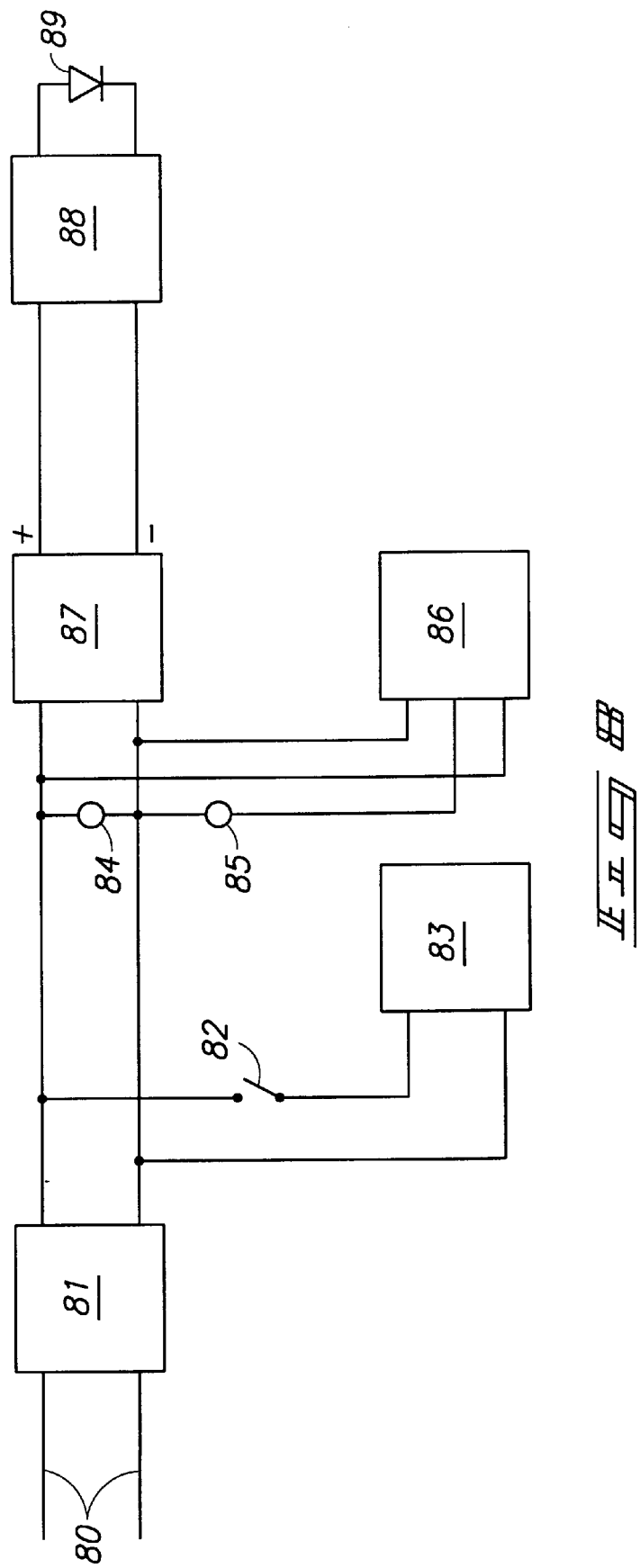
FIG. 8 is an electrical block diagram of the electric powered washer.

In FIG. 8, the circuitry for the electric powered washer, a 120 v. A.C. current enters the electrical circuit at 80 to ground fault interrupter 81, pump switch 82, electric pump 83, power indicator 84, heater status indicator 85, heater and thermostat 86, low voltage supply 87, low level fluid alert 88 to flashing L.E.D. 89.

Figure 9:
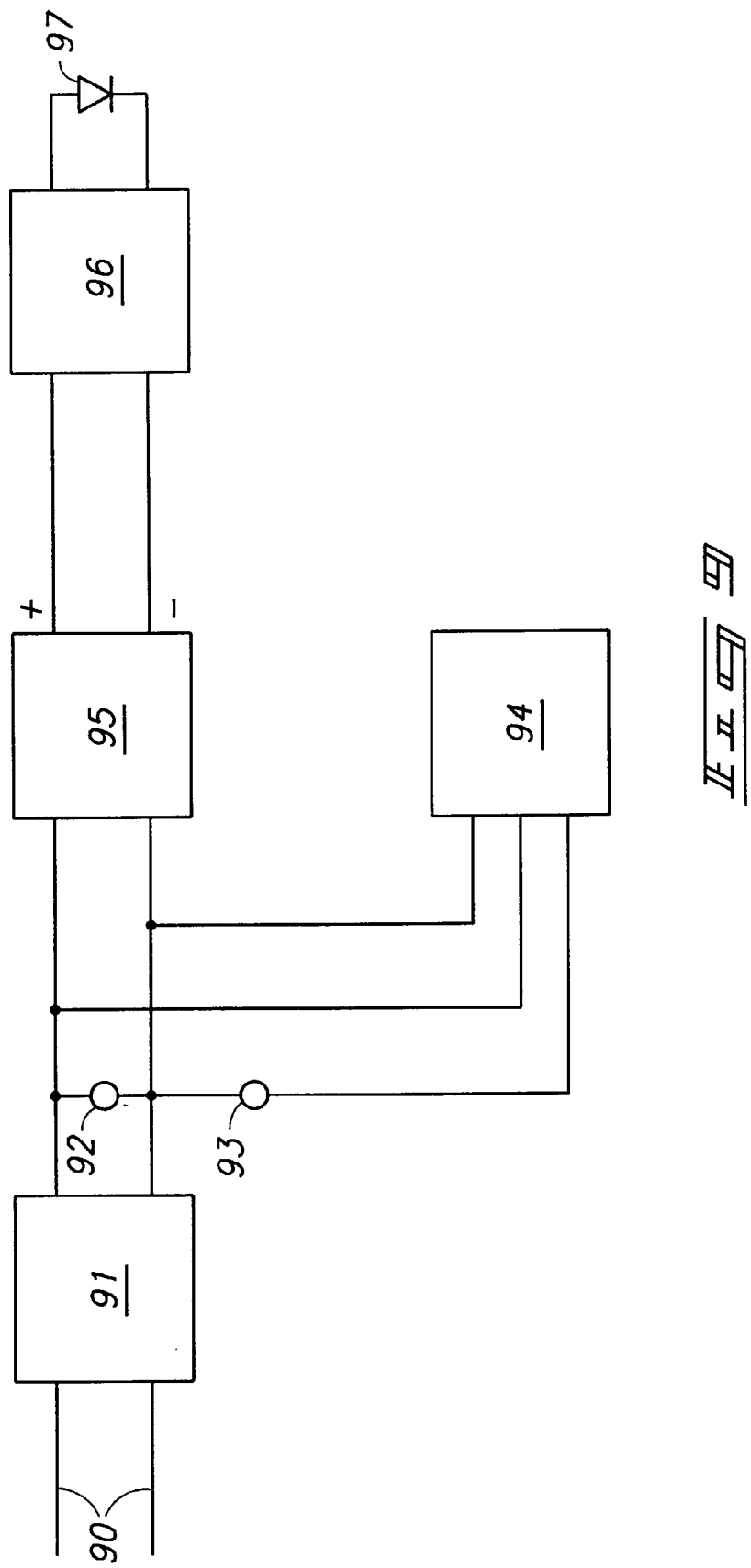
FIG. 9 is an electrical block diagram of the air-driven washer.

In FIG. 9, the circuitry for the air-driven washer, a 120 v. A.C. current enters the electrical circuit at 90 to ground fault interrupter 91, power indicator 92, heater status indicator 93, heater and thermostat 94, low voltage supply 95, low level fluid alert 96 to flashing L.E.D. 97.

Figure 10:
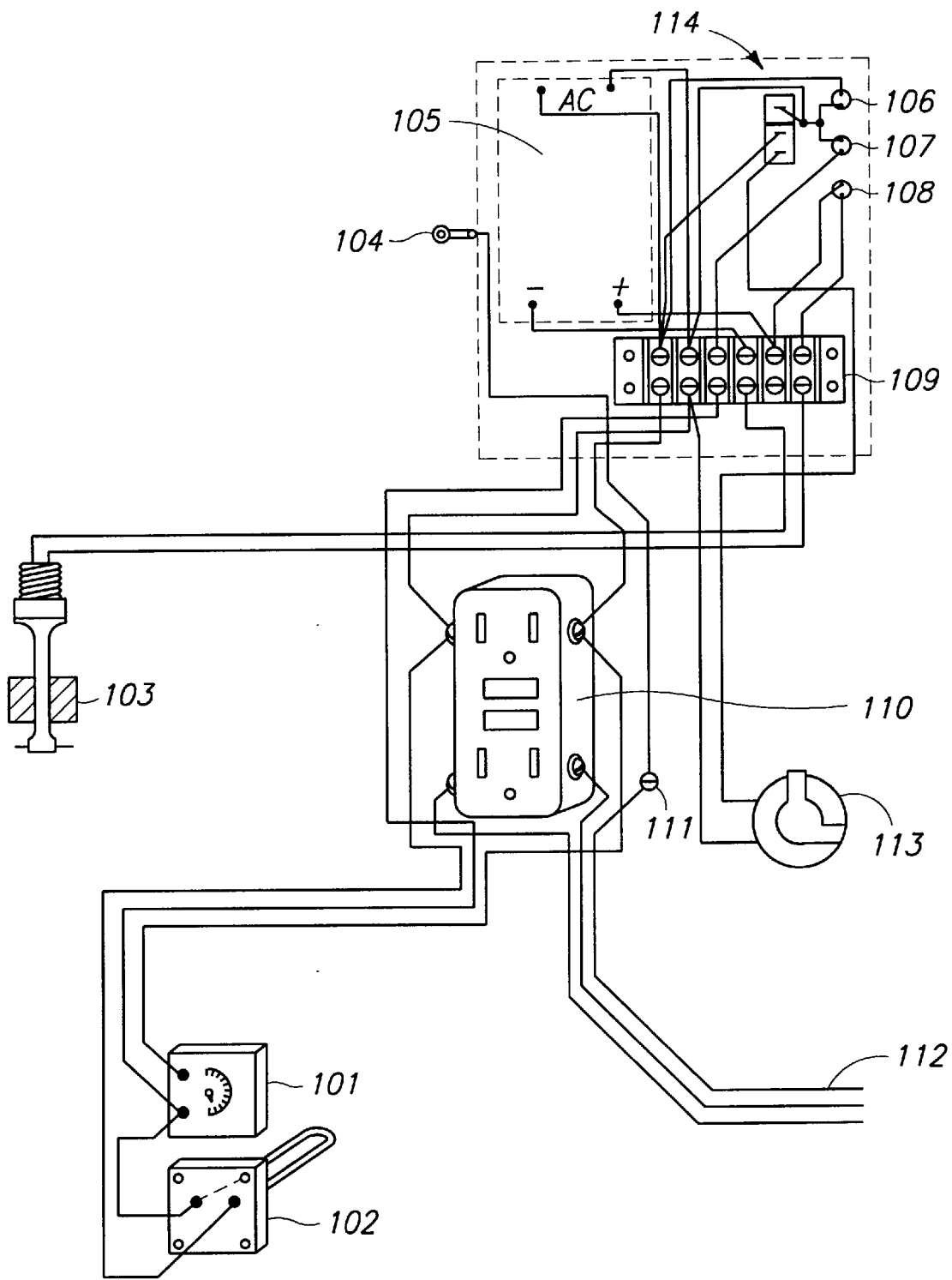
FIG. 10 is an electrical circuit schematic diagram of the block diagram of the electric powered washer of FIG. 8.

In FIG. 10, the circuitry for the electric powered washer, power cord 112 connects to ground fault circuit interrupter 110, first ground terminal 111 and second ground terminal 104. Interrupter 110 connects to thermostat 101, heater 102, low voltage power supply unit 105. Low voltage unit 105, through terminal strip 109, supplies current to thermostat 101, power light 106, heater light 107, low-level fluid alert 108, float switch 103, electric pump 113 and on/off lighted pump switch 114.

Figure 11:
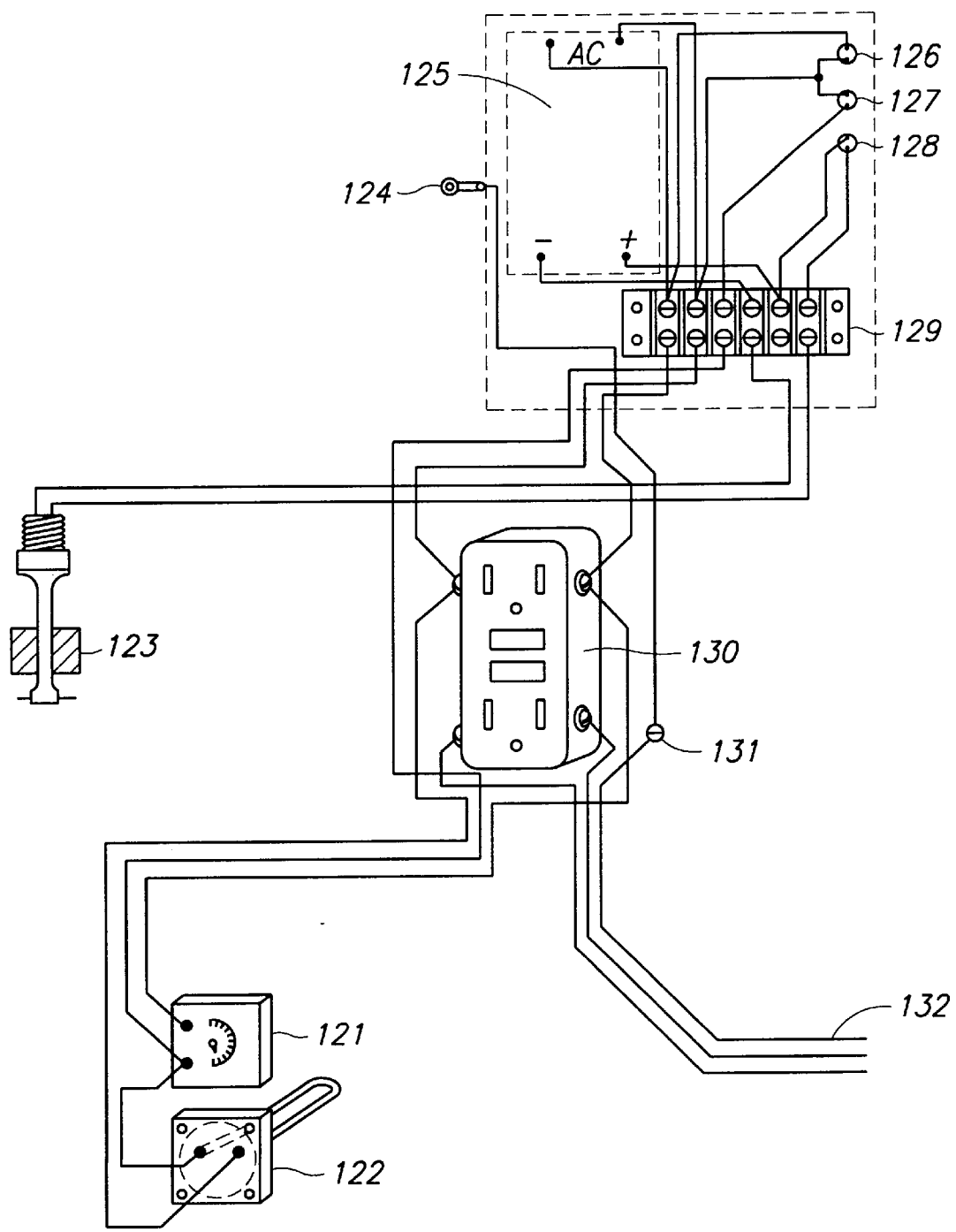
FIG. 11 is an electrical circuit schematic diagram of the block diagram of the air-driven washer of FIG. 9.

FIG. 11 is a schematic diagram of the circuitry for the air-driven washer. Power cord 132 connects to ground fault circuit interrupter 130, first ground terminal 131 and second ground terminal 124. Interrupter 130, through terminal strip 129, connects to thermostat 121, heater 122 and low voltage power supply unit 125. Low voltage unit 125 supplies current to power light 126, heater light 127, low-level fluid alert light 128 and float switch 123.

Experimental Analysis

A 173 day experiment was completed at an automobile dealership (SATURN™ dealership in Spokane, Wash.) during which seventeen engines were overhauled along with several transmissions and other regular repair work. The only waste trail was clean sediment removed by filtering the solution every four (4) weeks. The hydrocarbons were bioremediated. The PC™ cleaning performance was found to be superior to petroleum solvents. The device and method of the present invention washes oils or greases as well as petroleum-based solvents and will dissolve hardened engine varnish with ease. Petroleum solvents have great difficulty with hardened engine varnish, requiring buffing or no removal at all. The PC™ cleaning solution is very gentle on the users' hands, eliminating an irritating dermatitis common when using chemical solvents.

In the test period, the cleaning solution was diluted 50% and maintained at a 12 gallon level. A total of 10.5 gallons of concentrate product was used (including the initial filling) and after the $173^{rd}$ day, the level was maintained at the 12 gallon mark. The evaporation rate of water to concentrate was 4.35 to 1.

The cleaning ability improved with use because the microbes increased the natural enzymes as they degraded the hydrocarbons. $H_2O$, $CO_2$, tailored enzymes and more microbes were the by-products. The controlled temperature, constant 24 hour/day $O_2$ supply, continuous fluid circulation and sludge prevention, together with the cleaning solution, was effective in providing maximum cleaning and bioremediation while replacing the usual chemical solvent system with a complete ECO system.

| I. TEST DATA: SATURN ™ AUTO DEALERSHIP | |
|---|---|
| TOTAL TEST TIME: | 173 Days |
| *TOTAL GALLONS NATURES WAY PC ™: | 10.5 |
| TOTAL FILTERS: | 6 Each |
| REFILL MIX: | 1 PC ™ to 5 Water |
| DECEMBER 1995: | |
| 12/8    Set up washer: 6 gal. PC ™, 6 gal. water. | |
| 12/15   Added 1.0 gal. water | |

-continued

I. TEST DATA: SATURN ™ AUTO DEALERSHIP

| | |
|---|---|
| TOTAL TEST TIME: | 173 Days |
| *TOTAL GALLONS NATURES WAY PC ™: | 10.5 |
| TOTAL FILTERS: | 6 Each |
| REFILL MIX: | 1 PC ™ to 5 Water |

| | |
|---|---|
| 12/22 | Added 1.0 gal. water |
| 12/29 | Added 0.5 gal. water |
| JANUARY 1996: | |
| 01/05 | Added 1.0 gal. water, 1 gal PC ™ |
| 01/12 | Added 1.0 gal. water |
| 01/19 | Added 1.5 gal. water |
| 01/26 | Added 1.0 gal. water, 32 oz. PC ™ and filtered the system. |
| FEBRUARY 1996: | |
| 02/02 | Added 1.0 gal. water |
| 02/09 | Added 1.0 gal. water, 32 oz. PC ™ |
| 02/16 | Added 1.0 gal. water |
| 02/23 | Added 1.0 gal. water |
| MARCH 1996: | |
| 03/01 | Added 1.5 gal. water, 32 oz. PC ™ and filtered the system |
| 03/08 | Added 1.0 gal. water |
| 03/15 | Added 1.5 gal. water |
| 03/22 | Added 1.0 gal. water, 32 oz. PC ™ |
| 03/29 | 1.5 gal. mix of water and PC ™ |
| APRIL 1996: | |
| 04/05 | Added 1.5 gal. water and filtered the system. |
| 04/12 | Added 2.0 gal. mix of water and PC ™ |
| 04/19 | Added 1.0 gal. mix of water and PC ™ |
| 04/26 | Added 2.0 gal. mix of water and PC ™ |
| MAY 1996: | |
| 05/03 | Added 2.0 gal. water |
| 05/10 | 1.0 gal. mix and filtered the system (mix equals 1 part PC ™: 4.35 water) |
| 05/17 | 1.5 gal. mix |
| 05/24 | 1.0 gal. mix |

*This test determined that the loss from evaporation and use is approximately 1 part PC ™ to 4.35 parts water. The mixture of PC ™ to water is 3.3 qts. of PC ™ to 14.35 qts. of water in a five gallon pail with spouts resulting in a ratio of 4.35 to 1.

This same prototype washer was in continuous use in the service department for 57 weeks. The cleaning ability at week 57 appears to be superior to the time the washer was installed. The PC™ solution has been filtered at six week intervals. Fluid has been added to compensate for normal use, but has never been changed in its entirety.

II. Carcinogenic Enviromental Test Data

To validate the claims, the devise promotes continuous enhanced microbial bioremediation and microbe reproduction. Tests for neutralizing the carcinogenics in various fuels and lubricants cleaned off of parts (ie. truck, bus, auto, or industrial) at the Fairchild Air Force Base motorpool were conducted. The tests were initiated by the USAF environmental office and proper chain of custody of the tested material was secured.

The electric powered washer in FIGS. 2 and 3, and the divorced filtration system FIG. 5c was used for the test. The divorced air-driven filtration system was used to remove the suspended sediment from the PC™ solution. Two (2), twenty (20) micron parallel and one (1), ten (10) micron series elements were used to filter the solution. Air Force environmental personnel took custody of the three used filter elements and the fluid surrounding them, sealing the elements in separate fluid proof plastic containers.

The testing process was designed to isolate each of the individual carcinogenic and harmful compounds found in the various fuels and lubricants used by the USAF. The test results demonstrate the device's ability to transform dangerous hydrocarbon contaminants to harmless non-detectable levels while sustaining and propagating specific microbial life in an ongoing manner. United States Air Force (USAF) Text Memorandum is incorporated herein by reference.

It is apparent from the foregoing that many other variations and modifications may be made regarding the bioremediation device and process described herein, without departing substantially from the essential features and concepts of the present invention. Accordingly, it should be clearly understood that the forms of the inventions described herein are exemplary only and are not intended as limitations on the scope of the present invention as defined in the appended claims.

What is claimed is:

1. A method for continuous bioremediation of a hydrocarbon-contaminated object comprising the steps of:

placing said hydrocarbon-contaminated object in a washer basin and continuously cleaning said object by introducing and recycling through said basin in contact with said object a cleaning solution comprising microorganisms of a genus selected from the group consisting of Achromobacter, Actinobacter, Alcaligenes, Arthrobacter, Bacillus Nocardia, Flavobacterium, Peudomonas and mixtures thereof;

said microorganisms exponentially increasing and degrading hydrocarbons into water and carbon dioxide;

draining microbe cleaning solution containing hydrocarbons from said washer basin through a screen that removes large grit particles into a biochamber reservoir;

aerating said microbe cleaning solution in said reservoir to provide oxygen for the microorganisms;

heating said microbe cleaning solution in said reservoir to a temperature of between about 90° to 112° to maximize microbial growth in said microbe cleaning solution;

continuously removing heavy sediment from said microbe cleaning solution into a sediment trap;

continuously screening said microbe cleaning solution through a plurality of filters to remove sediment of less than 10 microns to prevent sludge from forming in said reservoir; and recycling said microbe cleaning solution having sediment less than 10 microns removed to said reservoir or to said washer basin and then to said reservoir.

2. The method of claim 1, wherein said microbe cleaning solution is sprayed onto said hydrocarbon-contaminated object in said washer basin.

3. The method of claim 2, further comprising brushing said hydrocarbon-contaminated object while being sprayed with said microbe cleaning solution.

4. An apparatus for continuous bioremediation of a hydrocarbon-contaminated object comprising:

(i) a washer basin for continuously cleaning said hydrocarbon-contaminated object, said washer basin having means for introducing and recycling a microbe cleaning solution comprising microorganisms of the genus selected from the group consisting of Achromobacter, Actinobacter, Alcaligenes, Arthrobacter, Bacillus, Nocardia, Flavobacterium, Pseudomonas and mixtures thereof, for washing said hydrocarbon-contaminated object, means for draining microbe cleaning solution containing hydrocarbons from said washer basin into a biochamber reservoir and means for screening said microbe cleaning solution upon entry into said biochamber reservoir; and (ii) said biochamber reservoir having a means for temperature control between about 90° to 112° F. to maximize microbial growth in said microbe cleaning solution for degrading hydrocarbons in said solution, means for aerating said microbe cleaning solution, means for agitating and circulating said microbe cleaning solution, an outlet means to direct said microbe cleaning solution to a plurality of filters for filtering said microbe cleaning solution to remove sediment of less than 10 microns, an inlet means to return said microbe cleaning solution from said filters to said biochamber reservoir or to said washer basin and then to said reservoir; means for trapping and removing sediment from said microbe cleaning solution, and means for supporting said washer basin and biochamber reservoir.

* * * * *